UNITED STATES PATENT OFFICE.

ALADAR SKITA, OF KARLSRUHE, GERMANY, ASSIGNOR TO C. F. BOEHRINGER & SOEHNE, OF MANNHEIM-WALDHOF, GERMANY, A FIRM.

PROCESS OF PREPARING HYDROGENIZED PRODUCTS FROM UNSATURATED COMPOUNDS.

1,063,746.    Specification of Letters Patent.    Patented June 3, 1913.

No Drawing.    Application filed September 4, 1912. Serial No. 718,566.

*To all whom it may concern:*

Be it known that I, ALADAR SKITA, a citizen of Germany, residing at Karlsruhe, Germany, have invented certain new and useful Improvements in Processes of Preparing Hydrogenated Products from Unsaturated Compounds; and I do hereby declare the following to be a full, clear, and exact description of the invention, such as will enable others skilled in the art to which it appertains to make and use the same.

This invention relates to processes of hydrogenating unsaturated compounds; and it comprises a process of producing hydrogenated products from compounds having an unsaturated constitution or structure wherein such compounds, in solution or suspension, are treated with hydrogen, advantageously under pressure and advantageously in an acid menstruum, in the presence of a small amount of dissolved palladium chlorid or other compound of a platinum group metal; all as more fully hereinafter described and as claimed.

In German Patent 230,724 to A. Skita and C. Paal, there was disclosed the fact that colloidal solutions of palladium in acid liquids possessed the catalytic power of facilitating the addition of hydrogen to substances such as carbon compounds having multiple bonds. A reduction process based on this observation was characterized by allowing hydrogen to act on a solution of the material to be reduced containing a minimal amount of palladium chlorid and also a protective colloid; generally gum arabic. See the *Berichte der Deutschen Chemischen Gesellschaft*, vol. 42, page 1627 and vol. 43, page 3393. Further research has led to a profound change of this reduction method. It has been found that the reduction may also proceed without the use of a protective colloid; that is that an unsaturated substance can be hydrogenated when there is added to it, or to its solution or suspension, a small amount of palladium chlorid $PdCl_2$, or any other compound of a metal of the platinum group, and the whole is exposed to the action of hydrogen; most advantageously under pressure. An addition of free acid is usually advantageous in this operation, for example, hydrochloric acid, but it frequently suffices with many substances, as for example the fatty bodies, merely to add a simple aqueous solution of a compound of a metal of the platinum group.

The requirements of the process as regards pressure, temperature and concentration may be modified according to the properties of the substances to be hydrogenated. The hydrogen used need not be chemically pure.

The process is applicable to all sorts of unsaturated compounds having multiple linkage, including double linkage as well as higher multiple linkages.

In a typical example of the present process, 13.6 grams of camphene may be dissolved in about 300 cubic centimeters of alcohol and to this solution may be added about 5 cubic centimeters of a one per cent. aqueous solution of palladium chlorid, 45 cubic centimeters of water and 10 cubic centimeters of dilute hydrochloric acid (1:3). Hydrogen may be pumped into it at a gage pressure of one atmosphere under constant agitation of the solution and be absorbed. The hydrocarbon formed is dihydrocamphene.

In another example, 4.6 grams of phenylvinyl acetate may be dissolved in about 200 cubic centimeters of alcohol and 20 cubic centimeters of water, 5 cubic centimeters of dilute hydrochloric acid and 0.05 grams of palladium chlorid added. With hydrogen at a gage pressure of about one atmosphere, in about half an hour at 40° C. the theoretical amount of hydrogen is absorbed and phenylethyl acetate formed.

In still another example, about 50 grams of olive oil may be suspended in a solution containing about 0.05 grams of platinum chlorid, 20 cubic centimeters of alcohol, 50 cubic centimeters of water and 8 cubic centimeters of dilute hydrochloric acid. After treatment with hydrogen at a pressure of about 4 atmospheres and at a temperature of 70° C. a solid fat results.

In another example about 250 grams of castor oil may be well mixed with a solution of about 0.05 grams palladium chlorid in 5 cubic centimeters of water. The whole may then be treated in an autoclave with constant stirring by hydrogen under a pressure of 4 atmospheres at about 70° C. After about 2½ hours the oil will be found so far hydrogenated that it will solidify to a hard mass on cooling.

As another example, to a solution of 40 grams of codein in about 400 cubic centimeters water containing about 26.6 grams of 85 per cent. orthophosphoric acid may be added 16 cubic centimeters of a one per cent. solution of palladious chlorid and the whole exposed, with constant shaking, to the action of hydrogen at 1.5 atmospheres gage pressure at about 30° C. The hydrogen is very quickly absorbed so that the hydrogenation is complete in 15 to 30 minutes. The solution is made alkaline and shaken out with a relatively considerable amount of ether. On standing, hydrocodein crystallizes out from the ether. The base contains a molecule of water of crystallization with which it melts at 60° C. It forms salts which crystallize well.

What I claim is:—

1. A process for hydrogenating substances having multiple linkage comprising allowing hydrogen to act upon such a substance in the presence of small amounts of a dissolved compound of a platinum group metal.

2. A process for hydrogenating substances having multiple linkage comprising allowing hydrogen to act upon such a substance in the presence of small amounts of a dissolved palladium salt.

3. A process for hydrogenating substances having multiple linkage comprising allowing hydrogen to act upon such a substance in the presence of small amounts of dissolved palladium chlorid.

4. A process for hydrogenating substances having multiple linkage comprising allowing hydrogen to act upon such a substance in the presence of small amounts of a dissolved compound of a platinum group metal, the hydrogen being used under a greater pressure than that of the atmosphere.

5. A process for hydrogenating substances having multiple linkage comprising allowing hydrogen to act upon such a substance in the presence of small amounts of a dissolved palladium salt, the hydrogen being used under a greater pressure than that of the atmosphere.

6. A process for hydrogenating substances having multiple linkage comprising allowing hydrogen to act upon such a substance in the presence of small amounts of dissolved palladium chlorid, the hydrogen being used under a greater pressure than that of the atmosphere.

7. A process for hydrogenating unsaturated fatty substances comprising allowing hydrogen to act upon such a substance in the presence of small amounts of a dissolved compound of a platinum group metal.

8. A process of hydrogenating unsaturated fatty substances comprising allowing hydrogen to act upon such a substance in the presence of small amounts of a dissolved palladium salt.

9. A process of hydrogenating unsaturated fatty substances comprising allowing hydrogen to act upon such a substance in the presence of small amounts of dissolved palladium chlorid.

10. A process of hydrogenating unsaturated fatty substances comprising allowing hydrogen to act upon such a substance in the presence of small amounts of a dissolved compound of a platinum group metal, the hydrogen being used under a greater pressure than that of the atmosphere.

11. A process of hydrogenating unsaturated fatty substances comprising allowing hydrogen to act upon such a substance in the presence of small amounts of a dissolved palladium salt, the hydrogen being used under a greater pressure than that of the atmosphere.

12. A process of hydrogenating unsaturated fatty substances comprising allowing hydrogen to act upon such a substance in the presence of small amounts of dissolved palladium chlorid, the hydrogen being used under a greater pressure than that of the atmosphere.

13. A process for hydrogenating substances having multiple linkage comprising allowing hydrogen to act upon such a substance in the presence of small amounts of a dissolved compound of a platinum group metal and at a temperature below the boiling point of water, the hydrogen being used under a greater pressure than that of the atmosphere.

14. A process of hydrogenating unsaturated fatty substances comprising allowing hydrogen to act upon such a substance in the presence of small amounts of a dissolved compound of a platinum group metal and at a temperature below the boiling point of water, the hydrogen being used under a greater pressure than that of the atmosphere.

In testimony whereof I hereunto affix my signature in the presence of two witnesses.

ALADAR SKITA.

Witnesses:
M. C. MASSIE,
E. O. HILDEBRAND.